(12) United States Patent
Ouchi et al.

(10) Patent No.: US 8,350,986 B2
(45) Date of Patent: Jan. 8, 2013

(54) BACKLIGHT UNIT AND VIDEO DISPLAY APPARATUS APPLYING THE SAME THEREIN

(75) Inventors: Satoshi Ouchi, Kamakura (JP); Hajime Inoue, Yokohama (JP); Hidenao Kubota, Yokohama (JP); Mayumi Nagayoshi, Chofu (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 281 days.

(21) Appl. No.: 12/895,236

(22) Filed: Sep. 30, 2010

(65) Prior Publication Data

US 2011/0080532 A1   Apr. 7, 2011

(30) Foreign Application Priority Data

Oct. 2, 2009   (JP) .................................. 2009-230163

(51) Int. Cl.
  *G02F 1/1335*   (2006.01)

(52) U.S. Cl. ............. 349/62; 349/61; 349/66; 362/97.1; 362/97.2; 362/617

(58) Field of Classification Search .................... 349/61, 349/62, 66; 362/97.1, 97.2, 616, 617
See application file for complete search history.

(56) References Cited

U.S. PATENT DOCUMENTS

| | | | |
|---|---|---|---|
| 7,413,330 B2 * | 8/2008 | Furukawa | 362/600 |
| 7,826,698 B1 * | 11/2010 | Meir et al. | 385/31 |
| 8,064,743 B2 * | 11/2011 | Meir et al. | 385/31 |
| 8,092,062 B2 * | 1/2012 | Kubo et al. | 362/606 |
| 8,115,890 B2 * | 2/2012 | Ouchi et al. | 349/69 |
| 8,243,231 B2 * | 8/2012 | Hur et al. | 349/65 |
| 2007/0058393 A1 * | 3/2007 | Kim et al. | 362/613 |
| 2008/0231774 A1 * | 9/2008 | Tomita et al. | 349/66 |
| 2009/0185109 A1 * | 7/2009 | Yoon et al. | 349/65 |

FOREIGN PATENT DOCUMENTS

| | | |
|---|---|---|
| JP | 2006-134748 A | 5/2006 |
| JP | 2008-103162 A | 5/2008 |
| JP | 2008-103200 A | 5/2008 |
| JP | 2009-093808 A | 4/2009 |
| JP | 2009-176437 A | 8/2009 |

\* cited by examiner

*Primary Examiner* — John A Ward
(74) *Attorney, Agent, or Firm* — Miles and Stockbridge P.C.

(57) ABSTRACT

A backlight unit of thin-type comprises: at least one or more light source(s); plural numbers of light guide plates, each of which is configured to guide and irradiate the light of the light source(s) to a side of a liquid crystal panel; and a chassis, on which the light source(s) and the light guide plates are fixed, thereby being constructed by aligning the light guide plates, wherein the following conditions are satisfied:

$$15.0 \text{ mm} > h, 20° \leq \theta \leq 60°$$

when assuming that a distance from an irradiation surface of the backlight unit to the light guide plate is "h", and that an angle indicative of a half-value light intensity of a light emitting from a light emission surface of the light guide plate, thereby providing a video of high picture quality, and there is also provided a video display apparatus applying the same therein.

10 Claims, 5 Drawing Sheets

BACKLIGHT UNIT AND VIDEO DISPLAY APPARATUS APPLYING THE SAME THEREIN

This application relates to and claims priority from Japanese Patent Application No. 2009-230163 filed on Oct. 2, 2009, the entire disclosure of which is incorporated herein by reference.

BACKGROUND OF THE INVENTION

The present invention relates to a video display apparatus and a backlight unit to be applied therein, and it relates to, in particular, a backlight unit, being advantageous in thin-sizing and high picture quality, and also suitable for achieving an areal dimming (or a local dimming), and further a video display apparatus applying the same therein.

In recent years, as a backlight for a liquid crystal display apparatus is applied that of a side-light method, as is mentioned in the following Patent Document 1, for example. However, since the light source is disposed concentrating to an end of the screen, it is difficult to achieve heat radiation thereof, and therefore has a drawback of bringing about difficulty of achieving the local dimming and a large-sizing thereof. As a method for dissolving this is already known a so-called just under-method, which builds up a backlight by spreading or covering a rear surface of a liquid crystal panel with a large number of light sources, as is mentioned in the following Patent Document 2, for example.

However, in the case of the just-under method, in particular, since it is necessary to increase a number of the light sources for achieving the thin-sizing, this brings about an increase of costs and electric power consumption therein. Also, when trying to reduce the number of the light sources within the just-under method, it is necessary to increase thickness (e.g., a distance from the light sources to the liquid crystal panel) for reducing unevenness of brightness, and this is disadvantageous for achieving the thin-sizing of the video display apparatus.

PRIOR ART DOCUMENTS

<Patent Documents>

[Patent Document 1] Japanese Patent Laying-Open No. 2008-103162 (2008); and

[Patent Document 2] Japanese Patent Laying-Open No. 2008-103200 (2008).

BRIEF SUMMARY OF THE INVENTION

With the present invention, accomplished by taking various kinds of drawbacks within the side-light method and the just-under method mention above into the consideration thereof, it is an object to provide a backlight unit, being advantageous to thin-sizing and the high picture quality (for example, a high contrast of moving picture contrast), and also suitable for conducting the area dimming (or the local dimming) therewith, and a video display apparatus applying the same therein.

According to the present invention, there is provided a backlight unit, comprising:

at least one or more light source(s);

plural numbers of light guide plates, each of which is configured to guide and irradiate the light of said light source(s) to a side of a liquid crystal panel; and a chassis, on which said light source(s) and said light guide plates are fixed, thereby being constructed by aligning said light guide plates, wherein the following conditions are satisfied:

$$15.0 \text{ mm} > h, 20° \leq \theta 60°$$

when assuming that a distance from an irradiation surface of said backlight unit to said light guide plate is "h", and that an angle indicative of a half-value light intensity of a light emitting from a light emission surface of said light guide plate.

Also, according to the present invention, within the backlight unit as mentioned above, the following conditions are satisfied:

$$15.0 \text{ mm} > h,$$

when assuming that a length from a light incident portion of said light guide plate to an end portion thereof is "L", width of said light guide plate is "W", and a distance from an irradiation surface of said backlight unit to said light guide plate is "h", and further, $$0.1 \leq I \leq 0.6$$

where "I" is a light intensity at each of points separating from a center of a certain light guide plate by distance "L" in a direction to a neighboring light guide plate and separating by distance "W" in a direction perpendicular to that direction, and when assuming that a central brightness of said certain light guide plate is 1.

Further, according to the present invention, within the backlight unit as mentioned above, said plural numbers of light guide plates may be constructed in one body, being continuous in a first direction, or a second direction perpendicular to said first direction, or a direction combining said first direction and said second direction. Also, it may further comprises an optical member, being disposed on a light emission side of said light guide plate, which is configured to receive and diffuse the light from said light guide plate, and the irradiation surface of said backlight unit is an light incident surface of said optical member.

Also, according to the present invention, within the backlight unit as mentioned above, said light guide plate has a miniature light reflection element for guiding the light from said light source within a predetermined range of angles in a light emission surface of said light guide plate, or said miniature light reflection element is a prism, a micro-lens, a fine frustum of a cone, concave-convex grooves, or a blast forming surface.

And, according to the present invention, there is also provided a video display apparatus, installing the backlight unit described in the above, and combining a liquid crystal panel, an electric power circuit, a signal processing circuit, and a structure therewith.

According to the present invention, it is possible to provide a backlight unit, being advantageous to thin-sizing and the high picture quality (for example, a high contrast of moving picture contrast), and also suitable for conducting the area dimming (or the local dimming) therewith, and a video display apparatus applying the same therein.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE PREFERRED EMBODIMENTS

Hereinafter, embodiments according to the present invention will be fully explained by referring to the attached drawings.

Figure 1:
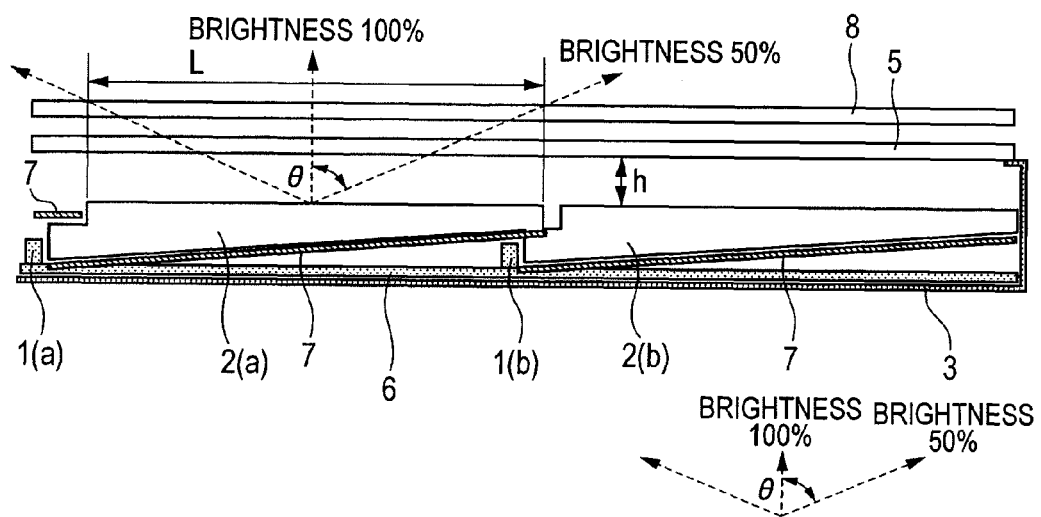
FIG. 1 is a cross-section view in the vertical direction of a screen of a backlight unit, according to an embodiment of the present invention.

FIG. 1 shows the cross-section view of a backlight unit, according to an embodiment 1 of the present invention, and explanation will be given on the first embodiment, by referring to this FIG. 1. However, although FIG. 1 shows the cross-section view in the direction vertical to the screen of the backlight unit, according to the present embodiment, but it may be constructed in such manner as is shown in FIG. 1 on the cross-section thereof, in the direction horizontal to the screen.

In FIG. 1, the backlight unit according to the present embodiment comprises: light sources 1(a) and 1(b), light guide plates 2(a) and 2(b), each for guiding the light from the light source 1(a) or 1(b) into an upper direction on the paper surface of the figure, thereby emitting the light therefrom; reflection members 7, each being provided on a rear surface side of the light guide plate 2, for reflecting the light emitting from the rear surface of the light guide plate 2, thereby guiding the light into an upper portion of the paper surface of the figure; a base plate 6, on which those light sources 1, the light guide plates 2 and the reflection members 7 are provided; and a chassis 3, on which the base plate 6 is fixed. On an upper surface side of the backlight, in other words, the light emission side thereof is provided an optical member 5, including a diffusing plate or a diffusing sheet, and/or a prism or a sheet attached with miniature lenses or minute patters thereon, etc., and thereby diffusing the lights from the light guide plates 2(a) and 2(b), so as to improve a uniformity of special (i.e., on the light emission surface of the backlight) brightness. Such optical member 5 may have a light diffusing effect, such as, fine or miniature cyclic structures and or a lens effect, etc., and/or a recurrent effect, etc., and with such effect(s), the uniformity of the brightness can be improved further. In this manner, with the present embodiment, as is shown in FIG. 1., there are aligned sets of the light source and the light guide plate, in a plural number thereof, in the direction vertical to the screen, but also are aligned a plural number of those, in the direction horizontal to the screen. Also, in FIG. 1, only two (2) sets of the light source and the light guide plate are shown in the figure, for the purpose of easiness, but of course, the number thereof may be larger than this.

In the present embodiment, as the light sources 1(a) or 1(b) is applied a light emitting diode (LED) of so-called a side-view type, emitting the light in the direction parallel to a surface of an electrode there, for example, and this side-view type LED is mounted on the plate-like base plate 6, which is disposed to be parallel with a bottom surface of the chassis 3. With this, it is possible to apply such side-view type LED as the light source, which may be constructed with a ceramic package or a long lifetime resin package, etc. As the light source, not the side-view type LED, but it is also possible to apply a LED of a top-view type, emitting the light in the direction perpendicular to the surface of the electrode. In case of applying the top-view type LED, a printed circuit board (not shown in the figure), which is made of materials, such as, AGSP (Advanced Grade Solid-bump Process), alumina (aluminum oxide), glass-epoxy, PCB, copper, etc., for example, is bent into the direction perpendicular to the bottom surface of the chassis 3, and on the surface of this bent portion is mounted the top-view type LED; then the printed circuit board mounting this top-view type LED thereon is attached on the base plate 6. With doing so, it is possible to bring the light emitting direction of the top-view type LED to be parallel to the bottom surface of the chassis 3.

Also, the light source should not be limited to the LED, but it may be a point-like light source, such as, a laser, etc., or may be a fluorescent light tube, such as, CCFL or EEFL, etc. Further, as the light sources 1(a) and 1(b) may be applied a set of LED combining a plural number thereof, each emitting a different color light (for example, R, G and B) therefrom. Though not shown in the figure, an optical part for mixing the color of light from each LED may be provided in each set of the LED. Also, as the light sources 1(a) and 1(b) may be applied LEDs, each emitting a same color (i.e., a white color) light (R, G and B) therefrom. Moreover, it is also possible to control intensity of luminance or light emission thereof, for each light source, or combining plural numbers of light sources as one (1) set. However, in FIG. 1, the light sources 1(a) and 1(b) are respectively shown by only one (1) piece, but in the present embodiment, it is assumed that plural numbers of pieces (for example, 3 pieces for each light guide plate) are aligned in the direction of depth on the paper surface of the figure.

The light guide plate 2(a) or 2(b) is made of a transparent resin material, for example, acryl, PMMA, ZEONOR®, BMC, OZ, polycarbonate, silicon, glass, etc. Further, on the light guide plate 2 may be processed optical concave/convex or roughness for adjusting permeability, reflectivity, diffusivity, light distribution, or a patterning for partially adjusting the permeability, or the reflectivity. Those concave/convex and patterning may be formed on the light guide plate 2 through a dot printing, for example, or the light guide plate 2 may be formed by an injection molding with using a metal mold, in which the miniature patterns and/or miniature lens are formed in advance. Further, the light guide plate 2(a) or 2(b) may be combined with an optical sheet, such as, a diffusion/reflection sheet, a mirror, a diffusion sheet, a prism sheet, a diffusion plate, a polarized light selective reflection film, etc., for example, and such optical sheet may be formed on a front surface or a rear surface of the light guide plate 2, through evaporation or printing, for example.

As the reflection member 7, which is disposed on the rear surface side of the light guide plate 2(a) or 2(b) (i.e., on the surface side facing to the chassis 3), may be applied a diffusion/reflection sheet, an aluminum reflection sheet, a laminate-type reflection sheet, etc., for example.

Also, though not shown in the figure, for the purpose of positioning the light guide plate 2(a) or 2(b) with respect to the chassis 3 or the base plate 6, a dwell, a hole, or a groove may be provided on the light guide plate 2(a) or 2(b) with respect to the chassis 3 or the base plate 6, for use of positioning or fixing thereof.

The chassis 3 is made of a metal, such as, aluminum, steel, magnesium, titanium alloy, etc., for example, and it is formed through a press, die-casting, cutting, etc. Also, the chassis 3 may be made, not the metal, but a resin, such as, acryl, PMMA, ZEONOR®, BMC, OZ, polycarbonate, silicon, etc., for example.

In case where the light guide plate of a backlight is built up with one (1) piece of the light guide plate, it comes to be difficult to obtain the uniformity of the brightness if it becomes large in the sizes thereof. Then, it can be considered to build up the backlight unit by combining the light guide plates, each having high uniformity of brightness, in plural numbers thereof. However, since the distribution of brightness of each of the plural numbers of light guide plates has a tendency that the brightness is high at a portion in the vicinity where the light source 1 is disposed, a difference of brightness is generated on a boundary between the plural numbers of light guide plates, and this brings about a possibility that the uniformity of brightness is deteriorated in a front surface of the backlight unit. Also, since there is a gap or a groove for each, between the light guide plates themselves, a dark line or a bright line is generated in that gap or groove, then this brings about a possibility the uniformity is deteriorated, locally, all over the entire backlight surface.

For the purpose of dissolving such deterioration of the uniformity of brightness, according to the present invention, as is shown in FIG. 1, on incident surface of the light guide plates 2(a) and 2(b) are disposed the light sources 1(a) and 1(b), a certain light source 1(b) is disposed in a portion lower that a bottom surface of the light guide plate 2(a) neighboring to the light guide plate 2(b) corresponding to that light source 1(b). With this, the light directly emitting from the light source 1(b) to an emission surface of the light guide plate 2(b) (i.e., the surface facing to the optical member 5) is interrupted or blocked by the light guide plate 2(b). Thus, the light guide plate 2(a) is put on a portion of the light incident surface of the neighboring light guide plate 2(b), while having a function of shading the light emitting from the light source 1(b) of the neighboring light guide plate 2(b) upwards. Further, since the reflection member 7 is provided on the rear surface of the light guide plate 2(a) (i.e., the surface on the side of the chassis 3), the shading effect mentioned above is increased much more.

Herein, assuming that the distance is "h" from an irradiation surface of the backlight unit (in the present embodiment, it is assumed that the irradiation surface of the backlight unit is the light incident surface of the optical member 5 of the diffusion plate and so on) to the light guide plate, and that an angle, at which the emission light of the light emission surface of the light guide plate 2 goes down to a half value of the light intensity, then the backlight unit, according to the present embodiment, satisfies conditions of the following Eq. 1 and Eq. 2:

$$1.5 \text{ mm} > h \quad \text{(Eq. 1)}$$

$$20° \leq \theta 60° \quad \text{(Eq. 2)}$$

Herein, with the half value of the light intensity, a light beam of the light source, having the brightness corresponding to 0.5, when assuming that a peak value of the brightness in a specific area is 1.0, is a half-value light. Within the present embodiment, on the light guide plate is attached or formed such a diffusion element, as was mentioned above, satisfying the condition, i.e., Eq. 2, relating to the light intensity of this half-value light.

With this, since an amount of leakage of light can be controlled between the guide plates neighboring to each other, and further since the amount of light leaking into the neighboring light guide plates can be suppressed, therefore it is possible to provide the backlight unit being compatible with high quality of pictures, i.e., a high dynamic contrast (e.g., a contract of the moving picture, or a dynamic contrast), and electric power saving, as well. However, a region determined by the area (i.e., the area of the light emission surface) of the light guide plate 2(a) or 2(b), when seeing the irradiation surface of the backlight unit from a picture observing side thereof (i.e., from an upper direction on the paper surface of the figure), will be called "area" hereinafter.

Herein, if assuming that the length of the light guide plate 2 is "L" from the light incident surface to an end portion thereof, the distance "h" is sufficiently small comparing to the length "L", it is possible to align the light guide plates, appropriately, if the number of division is large (for example, 64 division through 512 division, etc.), and thereby achieving backlight a thin type.

With the just-under method, the top-view type LED, emitting the light in the direction perpendicular to the electrode surface, is mounted on the plate-like base plate disposed in parallel with the chassis, and there is provided a diffusion distance, which is necessary for mixing the lights from the LED (i.e., the distance of light from the LED to the diffusion plate, and in general, the diffusion distance is large, such as, 16 mm to 50 mm); thereby reducing a hot spot or an unevenness of the brightness, which is generated by each LED. In case where an area control is conducted under the just-under method, in many cases, one (1) or plural numbers of a unit(s) of LED light source(s) (i.e., a package constructed with one (1) piece of white color LED, or an aggregate package combining three (3) LEDs of R, G and B, in one (1) set) is/are controlled as a unit region. Herein, the area control is controlling the intensity of the light from the backlight irradiation surface, locally or partially, and according to the present embodiment, it corresponds to controlling the intensity of the light for each area mentioned above. This area control can be also called, "local dimming".

In this instance, if increasing the thickness due to diffusion distance, so as to pile up the light from each of the light sources neighboring with, for reducing the unevenness of brightness of the unit LED light sources neighboring with, it is possible to irradiate the light on a wide range, and thereby reducing the unevenness of brightness. In this instance, at the same time of widening the diffusion light, the light reflecting upon the diffusion plate on an upper surface of the LED propagates from a region of a certain unit LED light source to the neighboring regions, and thereby obtaining the structure of irradiating a sufficiently large amount of the light onto that neighboring regions. Thus, since the light leaking into the neighboring regions increases under the just-under method, when a certain region is in ON condition and the neighboring region is in OFF condition under the area control, then almost the light of the region under the ON condition can irradiate on the region of the OFF condition, considerably. Accordingly, with the area control under the just-under method, it is difficult to obtain a desired dynamic contrast. Also, in case of the just-under method, since an emission angle of the light from the light source is widen by a lens or the like, it becomes insufficient to reduce, not only the contrast when displaying the moving picture, but also an influence upon the intensity of light between the regions neighboring with each other. For this reason, also an effect of saving the electric power becomes insufficient.

On the other hand, according to the present embodiment, if assuming that an angle of the emission light beam of the light intensity of the half-value light of the emission light from the emission surface of the light guide plate 2 (herein, the light beam of the light source corresponding to 0.5 of the brightness is the half-value light, when assuming that the peak value of the brightness of the specific area is 1.0) is "θ" (a half-value angle), since the backlight is so structured that it satisfies the condition shown by the Eq. 1 and the Eq. 2, as was mentioned above, it is possible to control the amount of light leaking between the neighboring areas and to suppress the amount of light leaking into the neighboring areas; therefore, it is possible to provide the backlight unit being compatible with the high dynamic contrast (e.g., high picture quality) and electric power saving, as well.

Also, according to the present embodiment, since the diffusion distance "h" can be made small, comparing to the just-under method, it is possible to reduce an amount of light flux leaking into the neighboring area, propagating in a space, and thereby increasing the dynamic contrast even when the neighboring area is in the OFF condition. For this reason, it is possible to reproduce a black having depth, about a black picture, and it is possible to display a high quality picture modulating light and darkness on a liquid crystal display 8. Further, when displaying the moving picture thereon, it is easy to control difference in the distribution of brightness between the areas. Thus, when a certain area 1 is in the ON condition, and the area neighboring with that area 1 is in the OFF condition, for example, although the half-value light beam leaks from the area 1 into the area 2, but an amount of that leaking light can be suppressed, by satisfying the condition of the Eq. 2 mentioned above, i.e., $20° \leq \theta \leq 60°$, therefore the dynamic contrast can be maintained between the neighboring areas.

Further, in case where an area 3 neighboring to the area 2 (i.e., neighboring over to the area 1) is in the OFF condition, since almost of the amount of light leaking from the area 1 into the area 3 can be suppressed, therefore it is possible to achieve the high dynamic contrast (to 30000:1), which cannot be reproduced under the just-under method.

Furthermore, according to the present embodiment, not all of the light does not leak into the neighboring areas, but a predetermined amount of the light can leaks therein. Because of this, while controlling the light intensity for each area depending on continuous moving picture signals, it is possible to suppress an abrupt change of the brightness between the neighboring areas themselves, and thereby to achieve a smooth change of the brightness. Thus, according to the present embodiment, since the amount of light leaking between the neighboring areas is adjusted, appropriately, then it is possible to provide a backlight system and a video display apparatus, enabling to display a picture of high quality thereon.

Also, with the reflection member 7 of the light guide plate 2(*a*), which is put on the light guide plate 2(*b*), according to the present embodiment, an increase of the brightness of the light guide plate 2(*a*) can be suppressed in the vicinity of the light source 1(*b*), and at the same time, since the diffusion distance "h" (i.e., the distance "h" from the irradiation surface of the backlight unit to the light guide plate) is maintained within a predetermined value, then it is possible to reduce the unevenness of the dark line generating from the gap between the neighboring light guide plates, and also the unevenness of the brightness, thereby suppressing the brightness difference on the boundaries among the plural numbers of the light guide plates 2. With this, it is also possible to provide a large-sized backlight unit having high uniformity of the brightness.

Further, since the light source 1 is disposed on the entire surface of the backlight unit, then density of heat generation from the light source 1 comes to be small, and therefore it is possible to provide a backlight unit having high heat-radiation characteristic. And, with combining such backlight unit with a liquid crystal panel 8, it is possible to provide a video display apparatus having high uniformity of the brightness.

Figure 2:
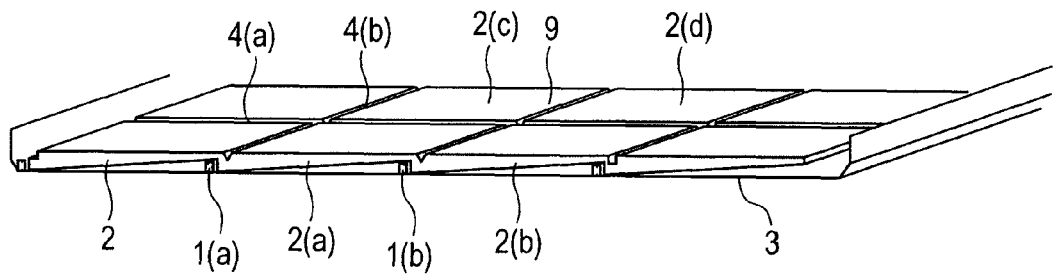
FIG. 2 is a perspective view of the backlight unit, according to the embodiment of the present invention.

FIG. 2 shows a perspective view of the backlight unit, according to the first embodiment shown in FIG. 1. The light guide plates 2 are disposed on the backlight unit, in a one-dimensional manner (i.e., in the horizontal direction or the vertical direction on the paper surface of the figure) or a two-dimensional manner (i.e., in the horizontal and vertical directions on the paper surface of the figure). Those plural numbers of light guide plates may be connected with each other, in the one-dimensional manner or the two-dimensional manner, in one body. Paying attention on the light guide plates 2(*a*), 2(*b*), 2(*c*) and 2(*d*), in case when connecting them with each other in the two-dimensional manner, for example, it is preferable to provide grooves 4(*a*) extending in the direction perpendicular to the screen on the boundaries of each of the light guide plates. With doing so, it is possible to divide the light distribution on each light guide plate, thereby enabling an appropriate distribution of the amount of light on each light guide plate, even when combining them in one body.

This groove 4(*a*) or 4(*b*) has a cross-section configuration, such as, a V-shaped configuration, a trapezoidal configuration, a configuration having a straight surface, or a configuration having R in a valley portion thereof, for example. Also, by taking the time when rapping the light guide plate from a die when forming it the through the die molding into the consideration thereof, on wall surfaces of the grooves 4(*a*) and 4(*b*) are attached rapping slopes or inclinations, each being larger than 2 degree on one side. Also, the surface of the groove 4(*a*) or 4(*b*) has a surface being nearly flat (i.e., mirror finish) through the die casting, so as to generate total reflection thereon. Since thickness of the light guide plate 2 gradually comes to be thin, directing from the light incident portion to a tip portion 9 thereof, the depth of the groove 4(*a*) or 4(*b*) comes to be shallow as it comes from the light incident portion to the tip portion 9. Also, the groove width comes to be small as it comes from the light incident portion to the tip portion 9. According to the present embodiment, since the diffusion distance "h" is determined to be sufficiently larger than a representative value (for example, an averaged value) of the width of the groove 4(*a*) or 4(*b*), the light irregularly reflecting on the groove 4(*a*) or 4(*b*) is diffused, sufficiently, and thereby suppressing the brightness to generate the unevenness in a portion of that groove.

Also, with controlling the brightness of the light guide plates, which are connected in one body in the one-dimensional manner or the two-dimensional manner, respectively, it is possible to control the brightness on the backlight unit, locally. As a result thereof, it is possible to improve the contrast by controlling the brightness fitting to the video signal.

Figure 3:
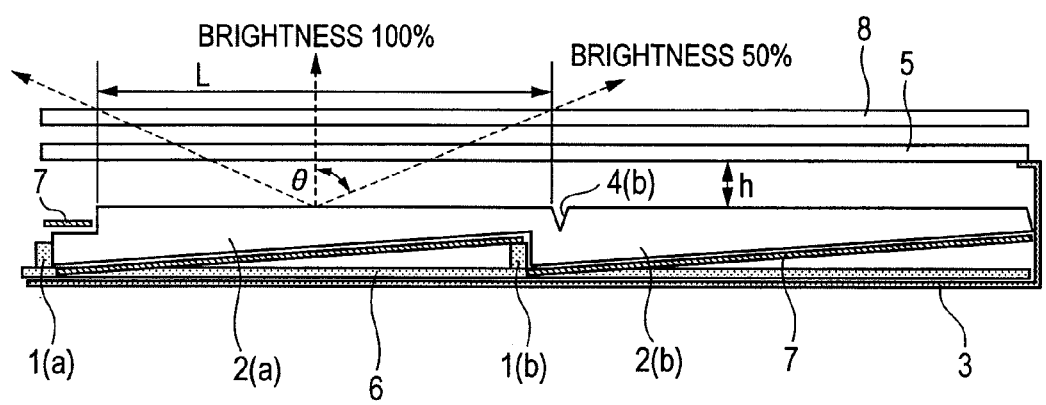
FIG. 3 is a cross-section view in the vertical direction of the screen, for showing an example of a connecting light guide plate.
Figure 4:
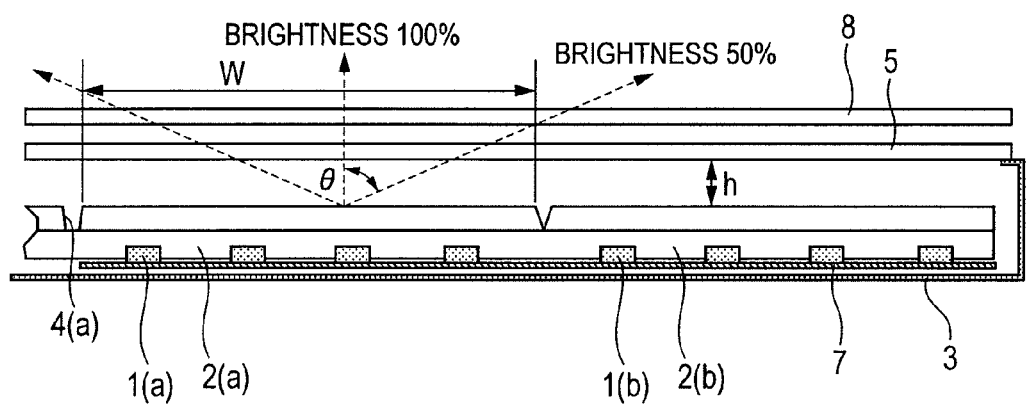
FIG. 4 is a cross-section view in the horizontal direction of the screen, for showing an example of a connecting light guide plate.

The cross-section view of the light guide plates, which are connected in one body, is shown in FIG. 3, in the direction perpendicular to the screen surface of the light guide plate (i.e., the direction from the light incident portion to the tip portion of the light guide plate 2). Also, the cross-section view of the light guide plates connected is shown in FIG. 4, in the direction in parallel with the screen surface thereof. FIG. 3 shows an example of connecting the plural numbers of light guide plates in the direction perpendicular to the screen surface, and FIG. 4 shows an example of connecting the light guide plates on one (1) line in the direction in parallel with the screen surface. It is of course, but on the light guide plates, which may be connected in both directions, perpendicular and parallel to the screen surface, as was shown in FIG. 2, the grooves are formed between the neighboring light guide plates in the direction in parallel to the screen surface (i.e., the direction aligning the light sources), but due to those grooves are/is generated the dark portion and/or the bright line, and thereby generating the unevenness of the brightness, as a unique line of light distribution. However, since the diffusion distance "h" is determined to be sufficiently large than the width of the groove, as was mentioned above, the dark portion and/or the bright line generating due to the grooves are fully diffused, so that the unevenness of the brightness mentioned above comes to be non-remarkable or inconspicuous.

Also, within the connected light guide plates shown in FIGS. 2 through 4, the diffusion distance "h" and a degree of diffusion on the light guide plates are so determined that they satisfy the condition of the Eq. 1 and the Eq. 2 mentioned above. With this, it is possible to provide a backlight unit being compatible with the high dynamic contrast (e.g., high picture quality) and electric power saving, as well, even with the backlight unit applying the connected light guide plates therein.

Also, since the light guide plates 2 are connected with, a part of the light is incident upon the neighboring light guide plate, crossing over the neighboring boundary from a side surface, and thereby the lights are mixed with. An amount of light leaking from the light source onto the neighboring light guide plate, generating herein, is controllable by the depth and/or the configuration of the grooves, which are formed between the neighboring light guide plates. For example, if assuming that the depth of the groove is always a half (½) of the thickness of the light guide plate 2, then the light leakage comes to about 10% to 50%, approximately. Of course, the leakage light changes depending on the number of the light sources and the width of the light guide plate 2. Also, if assuming that the depth of the groove is always around ⅓ of the thickness of the light guide plate 2, then an amount of the light leakage increases up to 20% to 60%.

Under the area control, for example, when turning a certain one (1) piece of light guide plate ON (i.e., lighten) alone, while turning 8 pieces of light guide plates neighboring to that light guide plate OFF, it is impossible to obtain a smooth performances of the moving picture if the light does not leak from the certain light guide plate, so that at least the brightness at a central portion of each of the four (4) pieces of light guide plates neighboring with vertically and horizontally comes down to around 10% to 60%, with respect to the brightness at the central portion of that certain light guide plate mentioned above. Accordingly, on the light guide plates connected, it is preferable to determine the depth of the groove to be formed between the neighboring light guide plates to be ½ through ⅓ of the thickness of the light guide plate.

Figure 5:
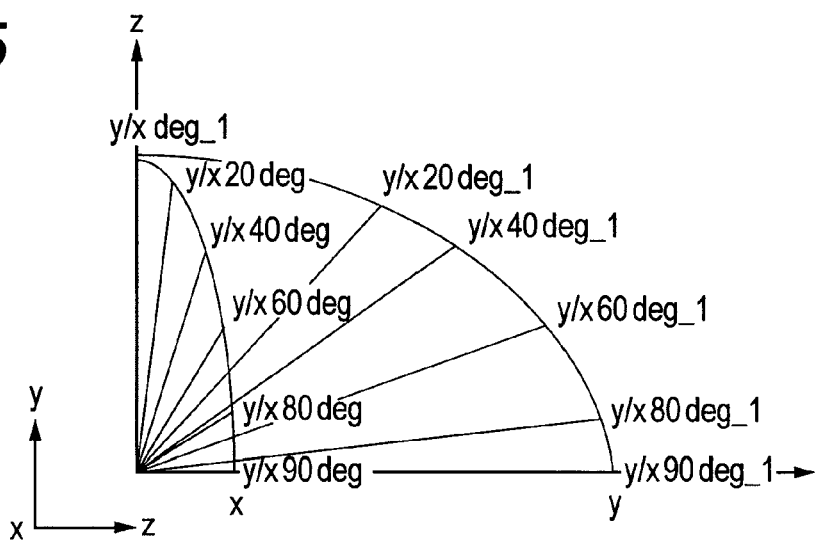
FIG. 5 is a view for showing a distribution of light of the backlight unit, according to an embodiment of the present invention.

Next, explanation will be made on the light distribution on the light guide plates, according to the present embodiment, by referring to FIG. 5. This FIG. 5 is a view for showing the light distribution of the light emitted from the optical member 5 (i.e., a kind of the optical sheet, or the diffusion plate having fine or miniature cyclic structures, etc.), wherein the Z-axis indicates the direction of a normal line of the backlight irradiation surface (i.e., the emission surface), the X-axis the direction in parallel with the screen surface, and the Y-axis the direction perpendicular to the screen surface (i.e., the direction of an axis of the emission light of the LED light source, in the present embodiment), respectively.

Because the light beam, which is normally emitted from the backlight, receives an optical influence from an element for adjusting the light distribution characteristics, i.e., for increasing a central brightness by enlarging a gain of the light, which is provided on the diffusion plate and/or the optical sheet, it has a predetermined light distribution characteristic.

According to the present embodiment, other than that, the diffusion light from the conventional florescent tube or the LED light source is allowed to have angular characteristics, as the controlled light beam, being controlled to be optimal on the high contrast and a light interference between the neighboring areas when executing the area control.

Figure 6A:
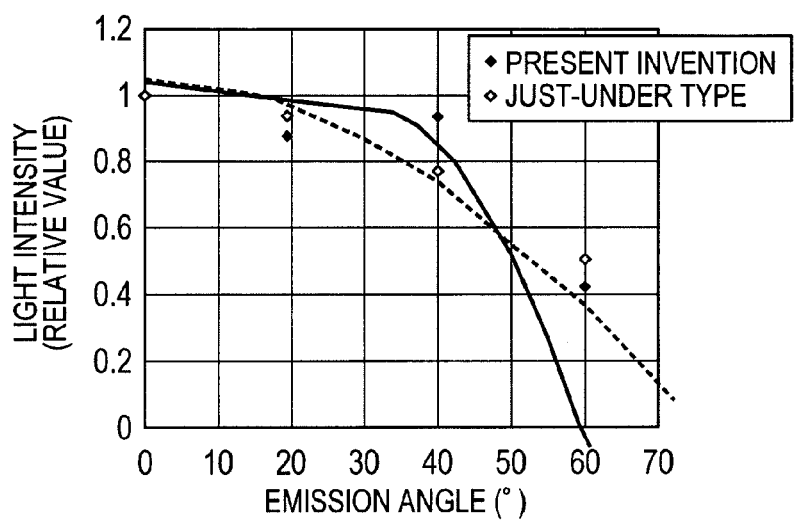
FIGS. 6A and 6B are views for showing a relationship between a light emission angle and a light intensity.
Figure 6B:
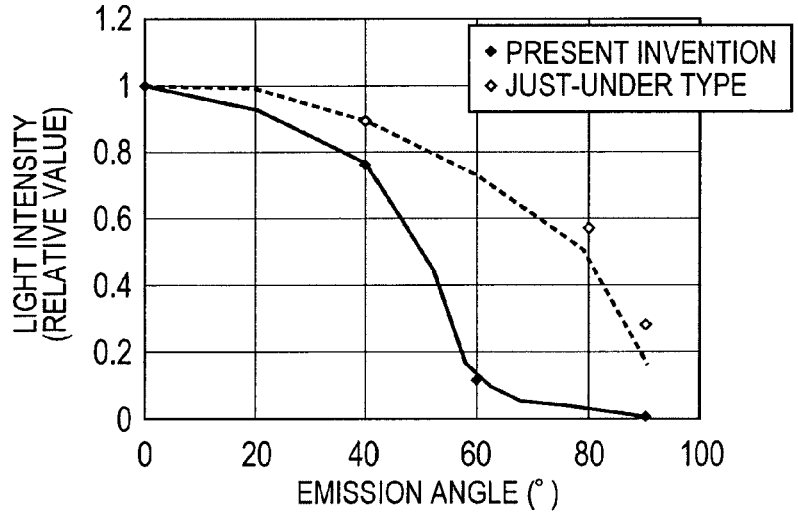

In FIGS. 6A and 6B are shown angular distributions on the respective emission surfaces (the characteristics of the light brightness (intensity) with respect to an angle of emission light beam), of the backlight of the conventional LED just-under method with execution of the area control and of the backlight of the method according to the present invention (a method of aligning light guide plate area blocks). As shown in FIGS. 6A and 6B, according to the present embodiment, an angle of the light beam of the half-value brightness 50% (a relative intensity 0.5) is controlled within a range of 20° to 60° when assuming that the central brightness (in the normal line direction) is 100% (the relative intensity 1.0).

Herein, the reason of determining a lower limit value of the angle of the emission light to be 10°, although it can be obtained from an actual measurement value, but for the purpose of avoiding a phenomenon; i.e., where ON-OFF of the brightness is executed, continuously, between the neighboring areas, when reproducing the moving picture, the brightness of the light emission on the surface of the block, as the area, changes extremely, thereby the configuration of the area comes to be seen. In the explanation given below, this phenomenon is called, "block noise".

Also, in case of combining or connecting the light guide plates, which are connected in one body, in the connecting portion thereof, since the light guide plates are not connected with themselves in one body, propagation of the light is reduced between the light guide plates themselves within an side of the light guide plates, and the light propagates into the neighboring light guide plates, mainly, due to the light leakage of the diffusion light from the emission surface. In this instance, the angle of the half-value light of the light becomes small, like the lower limit value mentioned above, and this is confirmed through an experiment.

Accordingly, according to the present embodiment, the light leakage is controlled to be optimal between the neighboring areas, therefore the amount of the light leakage into the neighboring areas is not too much, and the dynamic contrast comes to 3000:1 to 100000:1 when reproducing the moving picture. Further, since an appropriate amount of the light leakage is shared between the areas in common, a large brightness change cannot be multiplied between the areas themselves. For this reason, even when it is generated between the areas on the moving picture, the brightness change can be suppressed to be a smooth on, and thereby reducing the block noises and achieving both of the performances.

For a general LED just-under type backlight, it is difficult to achieve both of them; i.e., it enables the smooth reproduction of the moving picture, but almost unable to control the amount of the light leakage between the neighboring areas, and they come up to a large amount of leakage. For this reason, the dynamic contrast comes to around 1000:1 to 10000:1 when reproducing the moving picture. Accordingly, the backlight according to the present embodiment can obtain performances of contrast 3 to 10 times comparing to that of the just-under method.

Figure 7A:
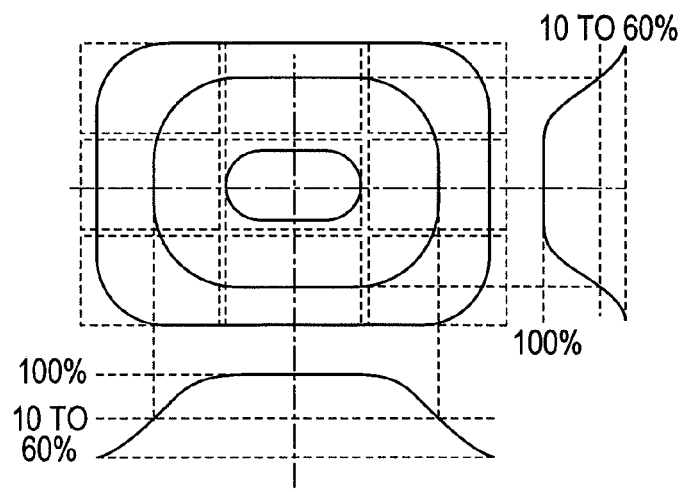
FIGS. 7A and 7B are views for showing a distribution characteristic of light of the backlight unit, according to an embodiment of the present invention.
Figure 7B:
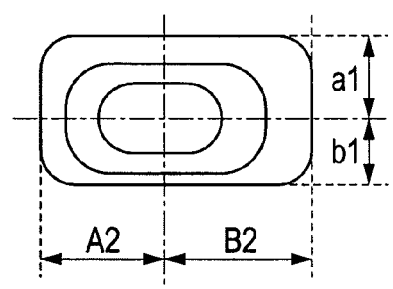

FIGS. 7A and 7B show the characteristics of brightness distributions of the backlight, according to the present embodiment. FIG. 7A the distribution of the light brightness (i.e., relative intensity distribution) under the ON condition of a standard area and the OFF condition of remaining 8 pieces of the areas, among the standard area and 8 pieces of the neighboring areas in the periphery thereof.

In this instance, it is preferable to bring the brightness at each center of the 8 pieces of areas neighboring with each other, due to the light leakage in the periphery of the standard area, to be around 10% to 60% when assuming that the central brightness of the standard area is 100%. This is a range necessary for achieving the dynamic contrast of 100000:1, as a result of designing with using a simulation. In the example shown in FIG. 7A, since it is necessary to suppress the amount of the light leakage into the neighboring areas as far as possible, within the range 10% to 60%, as is apparent from a damping property shown in FIG. 7A, it is possible to reduce the amount of the light leakage from the standard area into the neighboring areas, suitably or preferably. In other words, if not suppressing the amount of the light leakage down to 10% to 60%, as is in the present embodiment, the amount of the light leakage within the neighboring areas increases, and this deteriorates the dynamic contrast of the brightness distribution, largely.

Of course, as is shown in FIG. 7A, with the brightness distribution, control can be made, easily, if it has symmetric characteristics based on the area center, but as is shown in FIG. 7B, it may has asymmetric characteristics based on the area center, so as to increase the dynamic contrast further. For that purpose, it is desirable to achieve a relationship of being in the vicinity of the distances from the area center $a1=b1$ and $A1=B1$, for example, and to control the brightness distribution having a point symmetry, appropriately, within the range 10% to 60%, thereby suppressing it.

<Embodiment 2>

Figure 8:
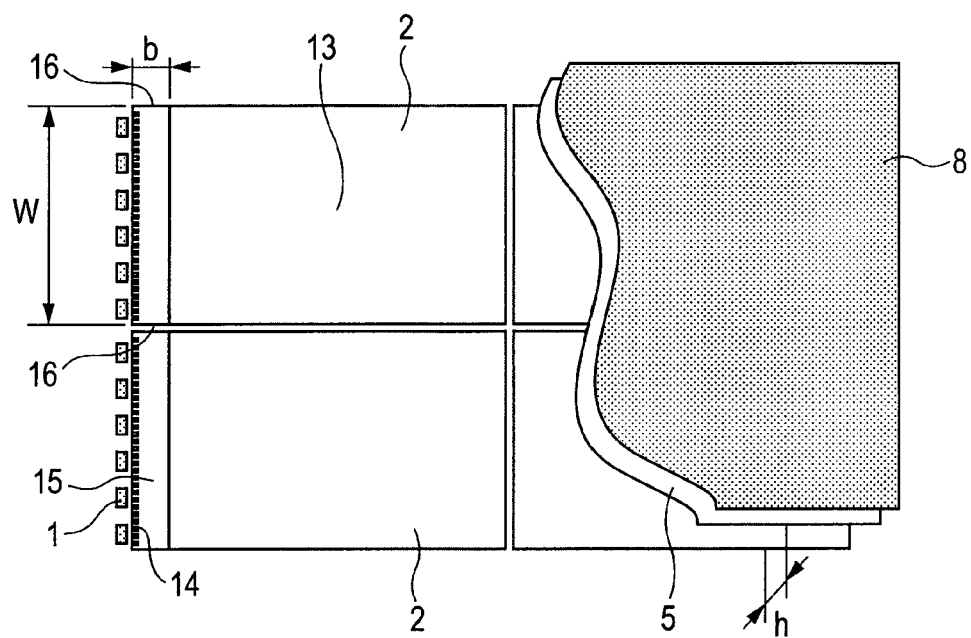
FIG. 8 is a view for showing a second embodiment, according to the present invention.

FIG. 8 shows a second embodiment, according to the present invention.

FIG. 8 shows a plane view of plural numbers of light guide plates 2 when seeing them from a side of the liquid crystal, wherein four (4) pieces of the light guide plates are aligned. Within the backlight unit, according to the present embodiment, are provided diffusion portions 14, each being provided at a light incident portion 10 of each light guide plate, and a light guide diffusion portion 15 up to an effective irradiation surface 13 of the light guide plate. And, when assuming that distance of the light guide diffusion portion 15 is "b", a number of the light sources "N", width of the incident portion of this light guide plate "W", a pitch of the light sources 1, which are disposed on the incident portion 10 "P" (when the light sources 1 are disposed equally on the incident portion 10, a pitch from the light sources on both sides to an end surface 16 is the distance of "P/2", and the pitch of the remaining light sources disposed in an inside is defined "P"), they are constructed so that they satisfy the relationships of Eq. 3 and Eq. 4, which are given below:

$$W = P \times N \quad (Eq.\ 3)$$

$$P/2\sqrt{3} \leq b \leq P/2 \times \sqrt{3} \quad (Eq.\ 4)$$

With this, it is possible to maintain the necessary light guide diffusion distance "b", in relation to the pitch "P" of the light source. For this reason, a sufficient light-guide diffusion distance "b" necessary for diffusing the light from the light source, such as, the LED or the laser, etc., for example, must be a sufficient long distance if an aligning pitch of the light source 1 is wide, on the other hand in case where the aligning pitch of the light source 1 is short, the lights of the neighboring light sources can mix up with, sufficiently, if the light-guide diffusion distance "b" is kept to be short, and therefore the light of the light source can be outputted onto an effective irradiation surface 13. For example, when aligning six (6) pieces of LED, with W=48 mm, at the pitch of P=8 mm, approximately, then P/2/√3=2.3 mm, P/2×√3=6.9 mm, then it is possible to obtain a sufficient light-guide distance necessary for mixing the lights of the light source if maintaining 2.3 mm≦b≦6.9 mm. With this, since the difference of brightness, the difference of chromaticity and the difference of light distribution, etc., due to the individual difference of the light source, are mixed with and averaged, it is possible to uniform or arrange properly the lights emitting from respective light guide bodies, from viewpoints of the brightness, the chromaticity and the distribution. In case where the diffusion portion 14 for diffusing the light of the light source of the incident portion 10 of the light guide plate 2 diffuses a main light of the light source by diffusion angle of 70 degree with respect to the normal line, the light guide distance "b"=2.3 mm is sufficient enough for mixing the light. On the other hand, in case where it diffuses the main light of the light source by diffusion angle of 45 degree with respect to the normal line, then "b"=4 mm, and in case where it diffuses the main light of the light source by diffusion angle of 30 degree, it must be equal to 6.9 mm ("b"=6.9 mm). In this instance, if determining the distance "h" from the effective irradiation surface 13 of the light guide plate 2 to the diffusion plate 5 on the side of the liquid crystal 8 (the distance to the irradiation surface of the backlight unit and the light guide plate is "h") to be equal to "b", it is possible to maintain the distance "h", being sufficient for diffusing the light emitting from the light guide plate 2, and thereby providing the backlight having a uniform distribution.

From the above, according to the second embodiment, the number of selections can be lowered, in selection/purchasing the LED, and therefore it is possible to maintain a stable yield rate of mass production. Thus, every the LED or the laser diode (LD) has an unevenness when purchasing it from a maker of a light source. For example, it is the unevenness of brightness or a color tone (or color temperature) or the light distribution or an angle characteristic, etc. Since it can be delivered after being divided or classified, through measurement of the distributions thereof by the maker of the light source, upon an aggregate of distribution or a similar characteristic, in a certain degree, it is possible to prepare a uniform light source if classifying it in details thereof. However, in this case, the yield rate becomes worse, or since the characteristics of respective light sources cannot be obtained at the same ratio, it may sometimes be a normal distribution with respect to a center of specifications. For this reason, the light source having the characteristics out of the center of specifications is unavoidably stocked in the storage for a long time, until when it is adopted in a product. For that reason, a cost of stocking in the storage is added onto a price of the light source, and then this brings about an expensive light source or backlight.

On the other hand, with the structures according to the present embodiment, because of applying the unit light guide plates, each applying plural sets of the light sources therein, in plural numbers thereof, even if the light source(s) has/have the unevenness of the specifications thereof, the backlight unit can be used with allowing that unevenness. This is because the lights of the plural numbers of the light sources are mixed with, with provision of the light guide distance. With this, it is possible to contribute to increase the yield rate, and also to purchase the LED without selection from a large number thereof; therefore, a cost of the light source can be reduced. By the way, a number of sets of the light sources to be used on one (1) piece of light guide plate is two (2) sets or more, and at the most, twelve (12) sets thereof can be aligned thereon. Even in case where the light source is a high-power one, such as, 50 lm to 200 lm/piece, and only one (1) set of light source is mounted on one (1) piece of light guide plate, for example, light leakage is generated from an end portion into the neighboring light guide plate, and mixing of the lights is generated, and therefore, according to the present embodiment, it is possible to reduce the number of selections of the light sources, to achieve an improvement of the yield rate of the light source, and to reduce the cost thereof. Furthermore, in case of a continuous body of the light guide plates, since the mixing of the lights can be further conducted, fully, the conditions of the specification for the light source can be moderated, and thereby expecting a low cost thereof.

Herein, according to the present embodiment, with an assumption that the distance from the irradiation surface of the backlight unit to the light guide plate is "h", if assuming that a central brightness of a reference area is 1.0 in case where 15.0 mm>h, then there can be obtained a backlight unit having the light intensity I, $0.1 \leq I \leq 0.6$ or less than that, at a point separating from a center of the reference area by distance "L" in the direction of the neighboring area, and a point separating therefrom by distance "W" in the direction perpendicular to that direction mentioned above, i.e., in the vicinity of the center of each of the areas neighboring thereto. With this, since it is possible to control an amount of leakage of the light between the neighboring areas, and thereby to control the amount of the light leaking into the neighboring areas, there can be provided the backlight unit having compatibility of both, the dynamic contrast (high picture quality) and the electric power saving.

<Embodiment 3>

Figure 9:
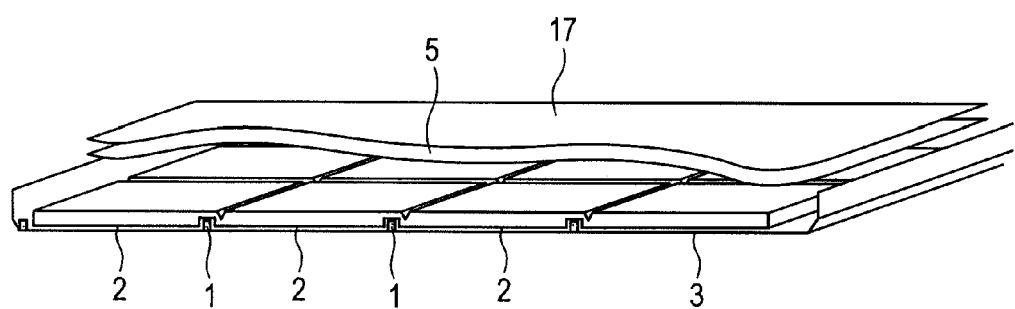
FIG. 9 is a view for showing a third embodiment, according to the present invention.

In FIG. 9 is shown a third embodiment, according to the present invention.

Within the backlight units described in the first and the second embodiments, there is proposed a backlight unit characterized by that, being provided the distance of the diffusion distance "h" mentioned above, at least two (2) or more kinds of the diffusion plates 5 or the diffusion sheets 17, each having fine or miniature cyclic structures in an upper portion of the light guide plate 2. With this, due to a correlation between the diffusing means and the distance "h", it is possible to reduce the unevenness of the light amount generating on the boundary between the light guide plates 2, further, and thereby providing the backlight having the uniformity. The diffusion plate 5 or the optical sheet 17 having the fine or miniature cyclic structures, even if it is available one on the market, may have a sufficient effect thereof; however, if having the fine or miniature cyclic structures of a triangle or a similar cross-section, it can control an angle of the light, and due to the diffusing effect and the recurrent effect of the light, it can repeats the reflection of light thereon, and thereby reducing the dark portion of the boundary unevenness and/or the peak brightness of the bright portion.

Also, the optical sheet 17 mentioned above can amplify the diffusing effect and the recurrent effect of the light even in the structure of being mounted on the light guide plate 2, and also can reduce the unevenness of brightness on the boundary between the light guide plates 2 and/or the unevenness of brightness within the surface of each of the light guide plates. The optical sheet 17 may be a brightness increase sheet, a diffusive sheet or a combination thereof. Then, a distribution of orientation of the light emitting from the light guide plate 2 is changed, and thereby improving the unevenness of brightness. As a result, there can be provided the backlight unit having high uniformity of the brightness.

Herein, according to the present invention, if assuming that a central brightness of a reference area is 1.0 in case where 15.0 mm>h, there is provided the backlight unit, having the light intensity I, $0.1 \leq I \leq 0.6$ or less than that, at a point separating from a center of the reference area by distance "L" in the direction of the neighboring area, and a point separating therefrom by distance "W" in the direction perpendicular to that direction mentioned above, i.e., in the vicinity of the center of each of the areas neighboring thereto. With this, since it is possible to control an amount of leakage of the light between the neighboring areas, and thereby to control the amount of the light leaking into the neighboring areas, there can be provided the backlight unit having compatibility of both, the dynamic contrast (high picture quality) and the electric power saving.

<Embodiment 4>

Figure 10:
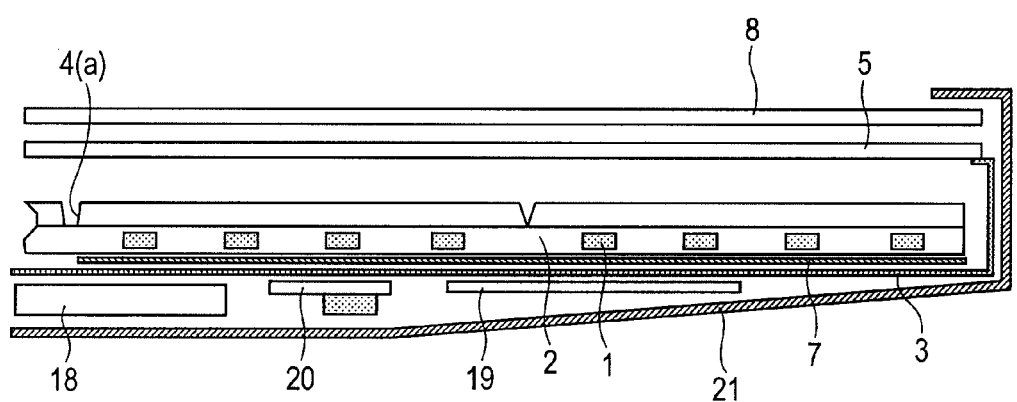
FIG. 10 is a view for showing a fourth embodiment, according to the present invention.

In FIG. 10 is shown a fourth embodiment, according to the present invention. Including the backlight therein, a video display apparatus is constructed by adding a liquid crystal panel 8. FIG. 10 shows a part of the cross-section of the structure. Also, the video display apparatus constructed with, being combined with an electric power source 18, a video signal processor circuit 19, a circuit 20 for use of the backlight, a chassis 3, fancy goods portion 21. With making each portion of this thin (i.e., 8 mm or less than that, in the thickness), it is possible to provide a liquid crystal TV or a liquid crystal monitor, installing a thin-type LED backlight therein. Regarding the thickness thereof, it is possible to achieve a monitor, being 10 mm to 19 mm at the most thin portion thereof, mounting the liquid crystal panel thereon.

Also, there is provided the backlight unit for enabling to provide the video or picture of high definition, having high uniformity of the brightness.

In the above, although the explanation was made on the embodiments according to the present invention; however, those embodiments are a part of the embodiments of the present invention, therefore the present invention should not be restricted only to those embodiments mentioned above. Thus, the present invention should not be limited to the embodiments, but, it is of course that the present invention can be changed, variously, within a scope not departing a gist of the present invention, for the person skilled in the art relating to the present invention.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. A backlight unit, comprising:
at least one or more light source(s);
plural numbers of light guide plates, each of which is configured to guide and irradiate the light of said light source(s) to a side of a liquid crystal panel; and
a chassis, on which said light source(s) and said light guide plates are fixed, thereby being constructed by aligning said light guide plates, wherein
the following conditions are satisfied:

$$15.0 \text{ mm} > h, 20° \leq \theta \leq 60°$$

when assuming that a distance from an irradiation surface of said backlight unit to said light guide plate is "h", and that an angle indicative of a half-value light intensity of a light emitting from a light emission surface of said light guide plate.

2. The backlight unit, as described in the claim 1, wherein said plural numbers of light guide plates are constructed in one body, being continuous in a first direction, or a second direction perpendicular to said first direction, or a direction combining said first direction and said second direction.

3. The backlight unit, as described in the claim 1, further comprising an optical member, being disposed on a light emission side of said light guide plate, which is configured to receive and diffuse the light from said light guide plate, and the irradiation surface of said backlight unit is an light incident surface of said optical member.

4. A backlight unit, comprising:
at least one or more light source(s);
plural numbers of light guide plates, each of which is configured to guide and irradiate the light of said light source(s) to a side of a liquid crystal panel; and
a chassis, on which said light source(s) and said light guide plates are fixed, thereby being constructed by aligning said light guide plates, wherein
the following conditions are satisfied:

$15.0 \text{ mm} > h$, when assuming that a length from a light incident portion of said light guide plate to an end portion thereof is "L", width of said light guide plate is "W", and a distance from an irradiation surface of said backlight unit to said light guide plate is "h", and further, $0.1 \leq I \leq 0.6$ where "I" is a light intensity at each of points separating from a center of a certain light guide plate by distance "L" in a direction to a neighboring light guide plate and separating by distance "W" in a direction perpendicular to that direction, and when assuming that a central brightness of said certain light guide plate is 1.

5. The backlight unit, as described in the claim 4, wherein said plural numbers of light guide plates are constructed in one body, being continuous in a first direction, or a second direction perpendicular to said first direction, or a direction combining said first direction and said second direction.

6. The backlight unit, as described in the claim 4, further comprising an optical member, being disposed on a light emission side of said light guide plate, which is configured to receive and diffuse the light from said light guide plate, and the irradiation surface of said backlight unit is an light incident surface of said optical member.

7. The backlight unit, as described in the claim 5, wherein said light guide plate has a miniature light reflection element for guiding the light from said light source within a predetermined range of angles in a light emission surface of said light guide plate.

8. The backlight unit, as described in the claim 7, wherein said miniature light reflection element is a prism, a microlens, a fine frustum of a cone, concave-convex grooves, or a blast forming surface.

9. A video display apparatus, installing the backlight unit described in the claim 1, and combining a liquid crystal panel, an electric power circuit, a signal processing circuit, and a structure therewith.

10. A video display apparatus, installing the backlight unit described in the claim 4, and combining a liquid crystal panel, an electric power circuit, a signal processing circuit, and a structure therewith.

* * * * *